United States Patent [19]

Minnick

[11] 4,397,801
[45] * Aug. 9, 1983

[54] METHOD FOR THE PRODUCTION OF CEMENTITIOUS COMPOSITIONS AND AGGREGATE DERIVATIVES FROM SAID COMPOSITIONS, AND CEMENTITIOUS COMPOSITIONS AND AGGREGATES PRODUCED THEREBY

[76] Inventor: L. John Minnick, Box 271, Plymouth Meeting, Pa. 19462

[*] Notice: The portion of the term of this patent subsequent to Feb. 10, 1998, has been disclaimed.

[21] Appl. No.: 232,852

[22] Filed: Feb. 9, 1981

Related U.S. Application Data

[63] Continuation-in-part of Ser. No. 50,506, Jun. 20, 1979, Pat. No. 4,250,134.

[51] Int. Cl.³ .............................................. B02C 18/28
[52] U.S. Cl. .................................... 264/140; 106/120; 106/97; 264/15; 264/82; 264/118; 264/333
[58] Field of Search ................. 106/97, 109, 118, 120; 264/15, 82, 118, 121, 125, 140, 333

[56] References Cited

U.S. PATENT DOCUMENTS

| | | | |
|---|---|---|---|
| 2,977,214 | 3/1961 | McLellan | 264/140 |
| 3,015,553 | 1/1962 | Johnson | 264/140 |
| 3,469,961 | 9/1969 | Barnhart et al. | 264/15 |
| 3,895,088 | 7/1975 | Goksel | 264/333 |
| 3,965,020 | 6/1976 | Noll et al. | 264/333 |
| 4,148,627 | 4/1979 | Haley | 264/140 |
| 4,250,134 | 2/1981 | Minnick | 264/140 |

OTHER PUBLICATIONS

"Development of Potential Uses for Residue for Fluidized Bed Combustion Processes", FE 2549-3, Feb. 1977.
"Development of Potential Uses for Residue from Fluidized Bed Combustion Processes", FE 2549-6, May 1977.

*Primary Examiner*—Donald E. Czaja
*Assistant Examiner*—W. Thompson
*Attorney, Agent, or Firm*—Austin R. Miller

[57] ABSTRACT

The present invention relates to a method for preparing synthetic shaped cementitious compositions having high quality even without the addition of high energy binders, such as portland cement, through the use of the spent residue from a fluidized combustion bed of the type wherein limestone particles are suspended in a fluidized medium and sulfur oxides are captured, and pulverized coal fly ash.

12 Claims, 2 Drawing Figures

METHOD FOR THE PRODUCTION OF CEMENTITIOUS COMPOSITIONS AND AGGREGATE DERIVATIVES FROM SAID COMPOSITIONS, AND CEMENTITIOUS COMPOSITIONS AND AGGREGATES PRODUCED THEREBY

The Government has rights in this invention pursuant to Contract No. EF-77-C-01-2549 awarded by the U.S. Department of Energy. The Government has entered into a waiver of rights to Applicant. The effective data of such waiver is Jan. 9, 1981.

This application is a continuation-in-part of co-pending application Ser. No. 50,506 filed June 20, 1979, now U.S. Pat. No. 4,250,134 issued Feb. 10, 1981.

FIELD OF THE INVENTION

The present invention relates to novel cementitious compositions comprising the spent residue from a fluidized combustion bed of the type wherein lime or limestone particles are suspended in a fluidized medium, and wherein a carbonaceous fuel is ignited proximate said fluidized medium to capture therein substantial amounts of sulfur oxide impurities which are generated upon ignition of the carbonaceous fuel. The invention further relates to aggregate derivatives of said cementitious compositions and to a method for producing both the aggregate and cementitious composition itself. The cementitious compositions produced in accordance with the invention exhibit extremely high compressive strengths so as to allow their use in load bearing applications. The aggregates produced in accordance with the invention not only exhibit high compressive strengths, but are also able to withstand high shear abrasive forces so that the aggregates may successfully be substituted for conventional natural aggregates in most end use applications.

BACKGROUND OF THE INVENTION

The use of coal as a fuel in electric generator plants is well known. In recent times, emphasis upon the burning of coal for this purpose has been increasing due to the dependence of this country on foreign sources of oil, the relative scarcity of oil, and the high price thereof.

As the emphasis has shifted to the use of coal fuel, considerable opposition to its use, especially to the use of "high sulfur" content fuel has steadily increased. Opponents to the use of coal rely upon the deleterious effects that $SO_x$ emission (resulting from the combustion of coal) into the atmosphere have on the environment.

Generally, two approaches have been used to counter the problem of excess $SO_x$ emissions. The first has been to provide elaborate off-gas scrubbing units in combination with the coal boiler or furnace in coal combustion systems, usually pulverized coal combustion systems. The more generally accepted systems utilize lime or limestone as preferred sorbents. These devices wash the gas and absorb the sulfur oxides, producing a slurry or sludge that contains the sulfur oxide in the form of calcium sulfite and calcium sulfate. Some of the sorbent material that is currently in use contains other ingredients such as dolomitic lime and/or proprietary additives. Generally, the commercial applications are based on the use of either finely ground calcium carbonate (limestone) or a suspension of calcium hydroxide which is produced from high calcium quick lime.

Another solution to the problem of excess $SO_x$ emission in coal combustion systems has been to provide a fluidized combustion bed of lime or limestone in which the coal is ignited. Preferably, the coal is pulverized and also floats within this fluidized bed during the ignition thereof. The suspended lime or limestone particles thus capture substantial amounts of the oxidized sulfur content of the coal in the form of sulfates. After the spent fluidized bed combustion residue has been removed from the coal boiler furnace, problems with respect to the disposal thereof have been presented due to the various governmental regulations pertaining to the protection of the environment, and, also due to the fact that the spent residue has heretofore been thought useful for very few practical applications.

In my paper entitled "Development of Potential Uses for the Residue for Fluidized Bed Combustion Processes," FE 2549-3, I have suggested that the fluidized bed combustion residue be used, inter alia, as a cementitious matrix in the production of road base material, as a sorbent in gas scrubbers, and as a means for stabilizing scrubber sludge when fly ash is added to a combination of the residue sludge.

In my paper entitled "Development of Potential Uses for the Residue from Fluidized Bed Combustion Processes", FE 2549-6, I have suggested, inter alia, that a wet "blunging" pretreatment of the fluidized bed combustion residue is useful as a means of liberating the lime component of the residue (thus providing a relatively inexpensive source of lime) and that the compressive strength of scrubber sludge may be increased by mixing of the residue, sludge, and fly ash in certain proportions. U.S. Pat. No. 4,233,008 of Murray discloses an apparatus and method of curing concrete products with carbon dioxide gas.

Accordingly, despite the above noted means by which the spent residue from a fluidized bed combustion systems may be utilized, there remains a need for a commercially acceptable disposal method for the spent bed residue.

Despite the above noted disclosure of road base material including said residue, there remains a need for a high strength concrete-like material which incorporates such residue.

Of further importance is the need for a stable aggregate material which can be incorporated into concrete and concrete-like compositions to impart increased strength and dimensional stability thereto.

These and other needs are met by the present invention which is hereinafter described in detail and in the accompanying drawings wherein:

DETAILED DESCRIPTION OF THE INVENTION

Figure 1:
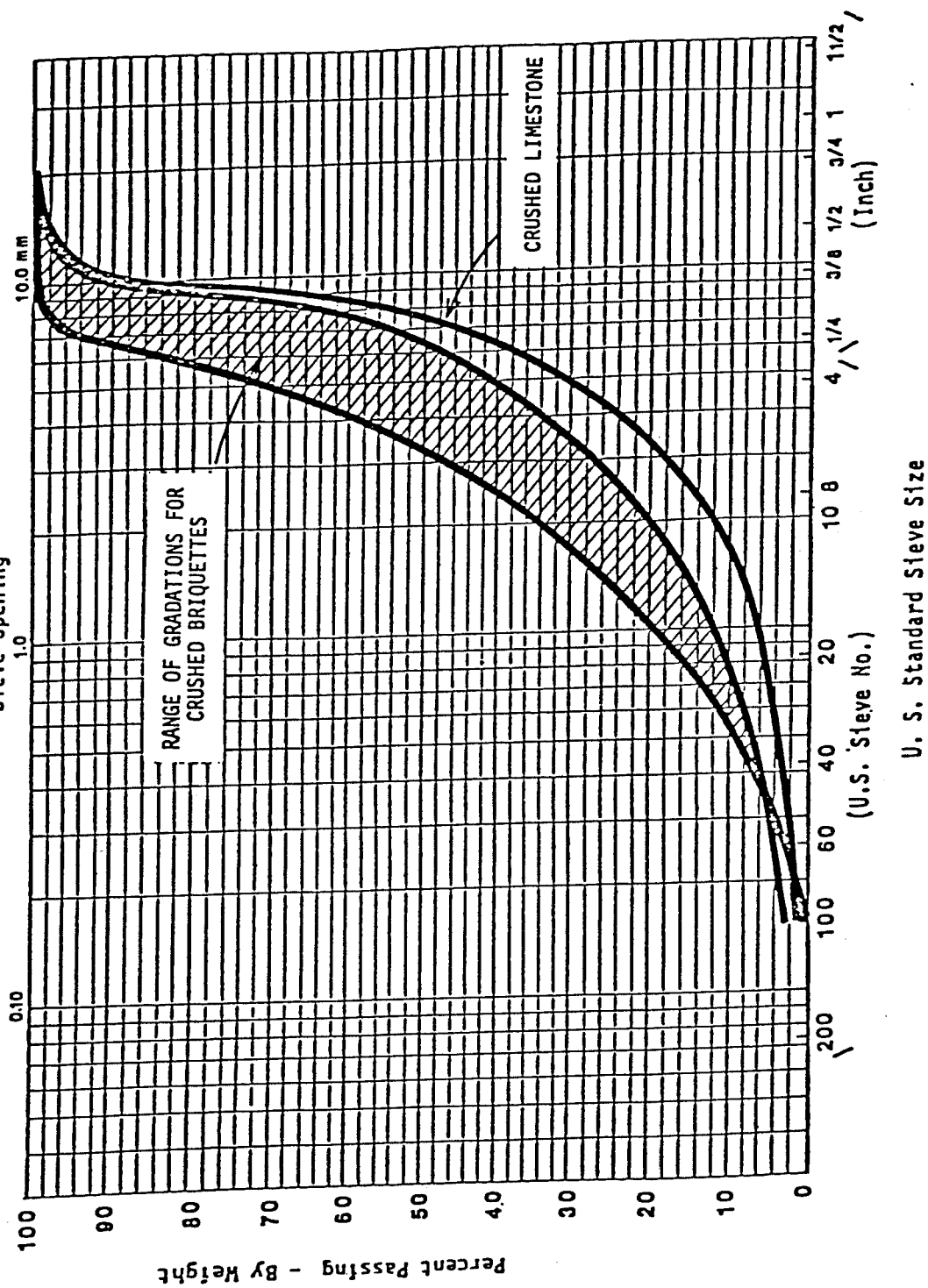
FIG. 1 represents the gradation of crushed material in accordance with the present invention as compared with commercial limestone rock.

As used in my invention, the term "fluidized bed combustion residue" (hereinafter FBCR) refers to the spent residue collected from a coal boiler or furnace wherein a mixture of crushed coal and limestone particles are floated in a fluidized medium proximate to the coal ignition located so as to remove certain $SO_x$ impurities from the ignited coal, which coal is usually in the crushed state. In addition to residue draining from the fluidized bed, some finely divided ash usually accompanies the off gas through the flue and is removed by means of a bag house dust collector or the like.

The composition of the FBCR varies slightly from boiler location to boiler location. The physical properties of the fluidized bed combustion residue taken from a first boiler plant located are provided in Table 1.

TABLE I
PHYSICAL PROPERTIES

1. Gradation (range of all testing to date) - ASTM D 422 - 63

| Sieve Size | % Passing Sieve |
|---|---|
| 1" | 100 |
| #4 | 98.8–100.0 |
| #10 | 82.5–98.8 |
| #40 | 1.4–50.1 |
| #200 | 0.2–4.1 |

2. Compaction test - ASTM D 1557 - 70 - Modified Moisture Density Relationship
   Maximum dry density - 109 pcf
   Optimum moisture content - 15.7–18.9%
3. Dry rodded weight - ASTM C 29 - 77.1 pcf
   Loose unit weight - ASTM C 29 - 72.4 pcf
4. Atterberg limits - ASTM D 423 - 66 and ASTM D 424 - 59
   Plastic limit - No plasticity
   Liquid limit - 34%
   Plastic index - Non-plastic
5. California bearing ratio - ASTM D 1883 - 73

| Sample No. | 1 | 2 | 3 |
|---|---|---|---|
| Dry density (before soaking) | 91.6 pcf | 94.0 pcf | 89.3 pcf |
| Moisture content (initial) | 13.4% | 13.3% | 12.9% |
| Moisture content (top 1" after test) | 26.9% | 25.9% | 25.4% |
| Swell | 0.029 | 0.035 | 0.031 |
| Swell | 0.41% | 0.49% | 0.44% |
| Bearing ratio | | | |
| 0.10 inch | 105.0% | 85% | 58.3% |
| 0.20 inch | 106.7% | 90% | 66.7% |

In certain cases, the fluidized bed combustion residue was preconditioned with sufficient water to hydrate the quick lime and release the heat of hydration prior to testing of the residue. The grain size analysis, dry rodded weight and loose weight determinations were performed on dry "as received" residue.

The general description of the fluidized bed combustion residue from the first plant location, based on the gradation and plasticity characteristics, is that of a uniformly graded sand. The AASHTO designation is A-1-b. The Unified Soil Classification System ascribes the letter designation SP for a poorly graded sand. Due to the friable nature of the residue, the classification could shift to SM for a silty sand after compactor forces are applied during placement of the residue in a fill. The loose and dry rodded weight of the residue are somewhat lower in value than natural sand, but the direct shear and permeability data are more typical of a silty sand.

Table II indicates the chemical constituency of fluidized bed combustion residue taken from the first plant location.

TABLE II
RESULTS OF CHEMICAL ANALYSIS OF FBC RESIDUE*
(FIRST PLANT LOCATION)

| | As Received FBC Residue (%) | Milled FBC Residue (%) |
|---|---|---|
| Loss on Ignition (LOI) | 9.86 | 6.80 |
| $SiO_2$ | 11.60 | 12.30 |
| CaO | 55.82 | 56.92 |
| $Fe_2O_3$ | 4.70 | 3.66 |
| $Al_2O_3$ | 1.80 | 3.44 |
| MgO | 1.81 | 0.87 |
| $SO_3$ | 14.95 | 14.26 |

*Major constituents

The "as received" residue from the first plant has an effective particle size diameter range of between 0.35–3.60 mm and an average particle size of 1.7 mm. The particle shapes of grains retained on a #30 mesh sieve are flat and angular. These characteristics are more pronounced as the particle size increases up to a #4 mesh material. The larger grains are flatter and subsequently sub-angular to a greater extent. The #8 mesh and larger material is reasonably sound and resistant to mechanical abrasion with finger pressure. Material passing through a #8 mesh sieve is readily friable producing a light brown powder.

Coloration of the residue from the first plant on the whole is heterogeneous and varies from sample to sample but, in general, the plus #8 mesh material is uniformly reddish brown and similar to a red shell, while the intermediate particle sizes are brighter with a reddish hue speckled with black carbon and white particles. The fines are variable due to the lower percentage of fines available. They range from grey-black to grey-white in color. The particle size distribution of the "as received" FBCR and the resulting alteration by "milling" (crushed and ground in laboratory jaw crusher and pulverizer) are as shown in Table III.

TABLE III

| Sieve Size (mesh) | Approximate Percent Retained |
|---|---|
| "AS RECEIVED" FBCR | |
| +4 | 2% |
| +8 | 8% |
| +16 | 52% |
| +30 | 30% |
| +60 | 7% |
| +100 | 2% |
| +200 | 1% |
| −200 | Trace |
| MILLED FBCR | |
| +4 | 0% |
| +8 | 2% |
| +16 | 8% |
| +30 | 18% |
| +60 | 60% |
| +100 | 2% |
| +200 | 0% |
| −200 | 10% |

The net effect in milling the "as received" FBC residue was to fracture the average residue grain into six major parts, with one constituting a fine dust.

The specific gravity of the "as received" FBC residue from the first plant was slightly reduced on milling to possibly increase carbonation and hydration of the exposed surfaces.

Other residue samples have been taken from the FBC boilers at two other plant locations. Table IV indicates the results of the chemical analysis of these additional two sample residues. Table V indicates the gradation of the two residues. Table VI indicates the results of X-ray diffraction analysis of the two residues.

In regard to the physical and chemical properties of the residue, during the combustion of the pulverized coal within the fluidized medium, the temperature of the fluidized bed causes the limestone particles to liberate carbon dioxide ($CaCO_3 \xrightarrow{\Delta} CO_2 \uparrow + CaO$) without resulting in substantial diminution of the precursor limestone particle size. When the resulting quicklime component is subjected to the sulfur dioxide emanating from the combusted coal and to the molecular oxygen existing in the combustion air, an anhydrous calcium sulfate reaction product is formed by the following reaction: $2CaCO + 2SO_2 + O_2 \rightarrow 2CaSO_4$. The $CaSO_4$ anhydrite is formed about the outer surface of the CaO particles and thus forms a shell which encapsulates the quicklime (CaO). The thickness of this shell is dictated by the length of exposure of the quicklime to the $SO_2$. If the CaO particle in the bed is small, the resulting reaction particle will be comprised of substantially all $CaSO_4$ anhydrite. On the other hand, and as is the case in most instances, the resulting reaction product will comprise spheres of anhydrous $CaSO_4$, with each sphere encapsulating a CaO (quicklime) core component. This factor distinguishes FBCR from other lime reaction products and provides a minor problem in that the $CaSO_4$ shells should be broken before the quicklime component of the residue can be liberated.

TABLE IV

CHEMICAL ANALYSES* OF SECOND AND THIRD PLANT LOCATION RESIDUES

| | Second Plant Location Residue (Samples Received 6/20/78) | | Third Plant Location Residue (Samples Received 6/29/78) | |
|---|---|---|---|---|
| | Drum #1 | Drum #2 | Drum #1 | Drum #2 |
| L.O.I. | 15.54 | 15.54 | 0.94 | 0.66 |
| $SiO_2$ | 6.18 | 5.78 | 1.86 | 2.20 |
| $Al_2O_3$ | 4.13 | 3.96 | 1.22 | 2.04 |
| $Fe_2O_3$ | 8.37 | 7.84 | 4.18 | 3.66 |
| CaO | 47.74 | 51.42 | 63.53 | 59.49 |
| MgO | 7.06 | 7.75 | 2.03 | 3.22 |
| $SO_3$ | 9.94 | 9.97 | 22.27 | 24.20 |

*Major constituents

TABLE V

| Sieve Size (mesh) | Approximate Percent Passing |
|---|---|
| FBCR FROM SECOND PLANT LOCATION BOILER | |
| 200 | 78% |
| 100 | 92% |
| 60 | 96% |
| 40 | 98% |
| 20 | 100% |
| FBCR FROM THIRD PLANT LOCATION BOILER | |
| 200 | 0% |
| 100 | 1% |
| 60 | 4% |
| 40 | 10% |
| 20 | 31% |
| 10 | 80% |
| 8 | 86% |
| 4 | 98% |
| ¼ | 100% |

TABLE VI

X-RAY DIFFRACTION ANALYSIS OF
THE SECOND AND THIRD PLANT LOCATION RESIDUES

| | Second Plant | Third Plant |
|---|---|---|
| PEAK HEIGHTS (UNITS AT RANGE FACTOR 500) | | |
| $CaSO_4$ | 80 | 136 |
| CaO | 134 | 170 |
| $CaCO_3$ | 30 | — |
| $\alpha SiO_2$ | 34 | — |
| COMPOSITIONAL RANGES | | |
| $CaSO_4$ | Major | Major |
| CaO | Major | Major |
| $CaCO_3$ | Minor | -- |
| $\alpha SiO_2$ | Minor | -- |

-- 1% or less
Trace <5%
Minor 5–25%
Major 25+%

In accordance with the invention, water is added to the FBCR in sufficient quantity to ensure hydration of all of the quicklime particles in the residue to calcium hydroxide. As above noted, the "as received" FBCR contains calcium sulfate anhydrate in the form of spheres which encapsulate the quicklime component, or substantially all of the quicklime component of the FBCR. Accordingly, in order to hydrate the quicklime component, mixing or mechanical agitation of the residue is necessary. I have found that the addition of from about 20–30 weight % water to the FBCR is sufficient to hydrate substantially all of the quicklime of the residue. As may be seen from the above chemical analyses of the FBCR, the calcium oxide content thereof is usually on the order of about 50%. Of this 50% total approximately one-third to one-half is available as free lime base. When hydrated, an approximate 10% weight increase in the material occurs due to the chemical combination of water. The addition of 20–30 weight % water to the FBCR provides excess water some of which may be lost due to evaporation caused by the heat given off during the hydration process.

Mixing of the FBCR and water for about 15 minutes ensures that the water necessary for hydration will come into intimate contact with substantially all of the free or available calcium oxide particles. Cooling of the residue to room temperature after mixing provides for safe handling, and also ensures that the hydration reaction is substantially complete.

A further waste material of the invention consists of fly ash from pulverized coal boilers. Fly ash is well known as a pozzolanic material comprising various silicoalumino and iron compounds usually existing in the form of finely divided spherical glassy particles. The properties of fly ash have been defined by several ASTM Standards, including C 618—Fly Ash for Use as a Mineral Admixture in Portland Cement Concrete—and C 593—Fly Ash and Other Pozzolans for use with Lime. Table VII provides a typical analysis of pulverized coal fly ash from three types of coal. Pulverized coal fly ash is normally recovered from the gaseous emission using electrostatic precipitation. This ash is a finely divided dust (particle size approximately 10–50 microns) in contradistinction to the bed drain from the fluidized bed combustion boilers.

Other waste materials may also be employed in the preparation of the products of the invention which include sludges such as produced by chemical industries generating waste calcium sulfates, or sludges produced by treatment of acid mine drainage in coal mines, or other types of trade acid wastes resulting from treatment with lime. Certain stack dusts from lime or cement plants may also be incorporated into the mix as a partial replacement for the fluidized bed residue.

Coal boiler bottom ash, steel slag, or other natural aggregates may be added to the mixtures, if desired.

TABLE VII

NORMAL RANGE OF CHEMICAL COMPOSITION OF FLY ASHES FROM DIFFERENT TYPES OF COALS

|  | Bituminous | Sub-bituminous | Lignite |
|---|---|---|---|
| $SiO_2$ | 20–60 | 40–60 | 15–45 |
| $Al_2O_3$ | 5–35 | 20–30 | 10–25 |
| $Fe_2O_3$ | 10–40 | 4–10 | 4–15 |
| CaO | 1–20 | 5–25 | 15–35 |
| MgO | 0–5 | 1–6 | 3–10 |
| $SO_3$ | 0–4 | 0–2 | 0–10 |
| $Na_2O$ | 0–4 | 0–2 | 0–6 |
| L.O.I. (Loss on Ignition) | 0–45 | 0–3 | 0–5 |

In accordance with another embodiment of the invention, controlled quantities of water are introduced together with selected ranges of composition of FBCR-pulverized coal fly ash mixtures into a high pressure forming apparatus such as briquetting rolls. This procedure provides an unusually high strength and high durability aggregate which is sufficiently large in size (approximately 2½"×5"×2" pillow shaped product) to qualify as a substitute for many quarry stones which are crushed to a dimension which can be stockpiled prior to final crushing to a size gradation meeting specifications for construction-type applications. Such "primary crusher sized rock" can be stockpiled for long periods of time and, in the case of the product of the invention, this provides a means of producing a substitute material which can replace depleted natural aggregates. Further, stockpiling waste materials in this manner results in desirable environmental characteristics such as the lack of leaching of deleterious elements into the stockpile area so as to avoid degradation of the terrestrial ground-water.

The product made in the briquetting process also provides a means for establishing high structural strengths without the addition of high energy intensive materials or binders such as portland cement or commercial grades of lime.

It is believed that the chemical reactions that are involved in the development of the structural properties of the product are analogous in part to well known pozzolanic and lime sulfo-aluminate cementitious reactions. However, the critical nature of the moisture concentration and range of proportions of the materials indicate unexpected occurrence of supplementary reactions which involve the formation of selected types of crystalline material which form at a rate sufficient to give early strengths and at the same time do not cause deleterious expansion in the cured aggregate that normally occurs when large quantities of the lime sulfoaluminate compounds are formed after the initial hardening of portland cement compositions.

The moisture control is also essential to provide the proper compaction of the briquette during formation and it is surprising that these water concentrations are compatible and within the ranges which provide simultaneous benefits to the chemical reactions, as well as to the structural properties of the briquettes.

While no heat or energy sensitive material is necessary to produce the briquetted product of the invention, small quantities of selected additives can be incorporated in some cases to alter the structure, specifically to reduce porosity and/or control ultimate density of the product. These additives may be small quantities of commercially available chemicals, such as, magnesium carbonate, ethyl silicate, magnesium fluorosilicate, etc., or they may simply be an addition of $CO_2$ gas supplied under controlled conditions during curing of the product as set forth in said U.S. Pat. No. 4,233,008. The reduction in porosity enables a user of the aggregate to control the rate of absorption of water when used in certain structural compositions, such as portland cement concrete which, when freshly mixed, may be required to sustain its fluidity or slump during the time that it takes to transport or place the material in its ultimate application.

METHOD OF OPERATION

A large scale test was designed to evaluate the manufacture of briquettes in a commercial plant capable of producing 500 tons per day of large size briquettes.

Figure 2:
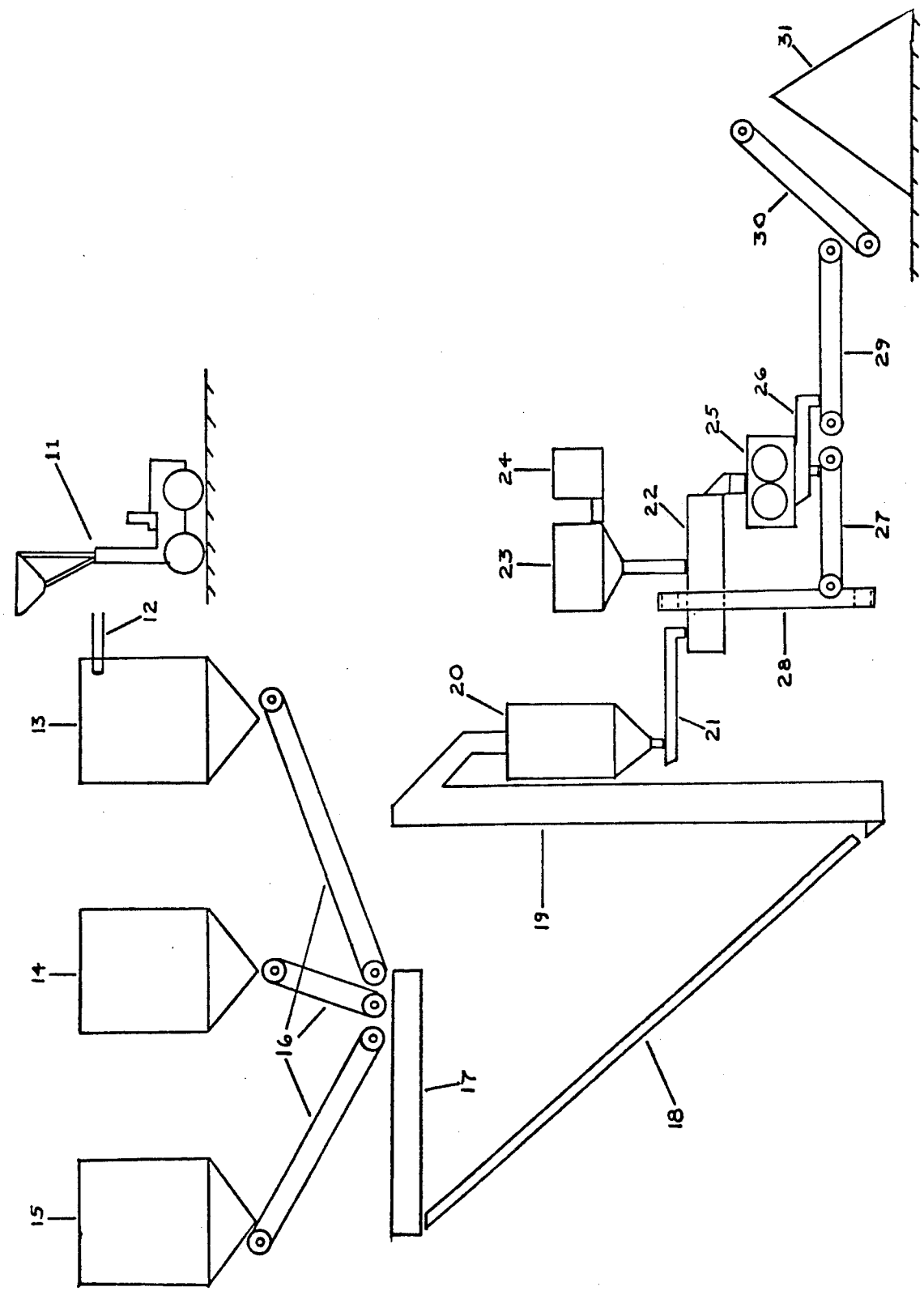
FIG. 2 is a schematic representation of a briquetting process in accordance with this invention.

As illustrated in FIG. 2, materials which eventually compose the synthetic aggregate may be initially assembled in storage bins 13, 14, 15. Loading may be accomplished by means of off-road vehicles 11 which are typical of those used in the construction industry, i.e., a pay loader or by a specially controlled pressure feed (for example, hose line 12). These bins 13, 14, 15 are usually receptacles of adequate structural integrity and are usually prismoidal in shape. The bin discharge may be regulated by either a gravity or screw feed. Bin size is preferably large enough so that storage for sustaining operational capacity for at least one full eight hour operation period is achieved. The bins 13, 14, 15 may be used for fly ash, fluidized bed boiler residue, and/or a previously prepared preblended waste sludge component.

The controlled discharge of the bins 13, 14, 15 may be accomplished by means of a belt conveyor 16 to a premix unit 17. The premix unit 17 may be utilized to combine the matrial flow from the storage conveyors into a single material flow stream. The single stream flow may be transported by means of conveyor 18 to a deposite pit for transport by a bucket elevator 19 to a surge bin 20. The surge bin 20 provides a steady influx of material to the transport screw conveyor 21 which immediately precedes the mixing and blending equipment of the system 22.

A transport conveyor 21 is located beneath the surge bin 20 and controls the quantity of material being fed to a mixer.

The mixer maintains a flow of material towards a briquetting machine 25 while achieving adequate agitation of material particles so as to produce a fairly homogenous blend.

The briquetting machine 25 shapes and compiles the blended material into the desired aggregate form. The material may be fed by gravity or mechanical means into closely bound rotating rolls of the briquetting machine 25. The pressure action between the rolls produces a shape dependent upon the roll imprint.

The discharge from the rolls may be passed onto an angled mesh-like screw 26 for separating out the undersized fragments. If desired, a conveyor 27 may be provided under the screen 26 for transporting the undersized pieces to a screening elevator 28 which discharges the particles directly back into the mixer.

In accordance with an important feature of this invention, control means 23 provides for the controlled addition of water directly into the mixer 22. The water contents of the subject mixes is controlled to provide the necessary concentration in the mix, usually ranging between 10 and 20 percent on a dry weight basis. Additives may be fed into the mixer 22 from an additive storage tank 24. The determination of the need for additives is dependent upon the material being processed through the system and the specifications dealing with the desired characteristics of the briquetted mixture.

A belt conveyor 29 may be provided for transporting the material which has been retained on the mesh-like screen 26; transporting it to a remote stacking conveyor 30. The remote stacker 30 is preferably adjustable, such that it can have the capacity to create aggregate stockpiles 31 in more than one location. This is necessary to maintain the distinction between the varying aggregate compositions which may be produced by this process.

The following Examples illustrate the preferred method of making the compositions in accordance with the present invention. It should, of course, be understood that these Examples are included for illustrative purposes only and that the invention is not necessarily limited to the particular combination of materials, conditions, proportions, etc., set forth therein.

EXAMPLE 1

Cylindrical specimens (4" in diameter and 4.5" in height) were molded using mixtures representing 5 different ratios of FBCR and fly ash. The cylinders were compacted in accordance with the procedure specified in ASTM C-593 (three layers, 25 blows per layer, 10 lb. hammer dropped 18"). The resulting cylinders were cured for 7 days at 73° F., and then tested for compressive strength. The compressive strength, molding moisture content, and dry density of each sample are shown herein below in Table VIII.

COMPRESSIVE STRENGTH OF MIXTURES OF THIRD PLANT LOCATION FBC RESIDUE AND PULVERIZED COAL FLY ASH

| Composition Third Plant Location | | Moisture Content at Molding (%) | Dry Density (pcf) | Compressive Strength (psi) @ 7 Days @ 73° F. | |
|---|---|---|---|---|---|
| FBC Residue | Fly Ash | | | | |
| 90% | 10% | 15.3 | 95.6 | 147 | |
| 80% | 20% | 22.1 | 98.3 | 274 | 233 Average |
| | | 23.7 | 97.0 | 274 | |
| | | 16.7 | 98.5 | 505 | 408 Average |
| | | 19.4 | 104.8 | 410 | |
| | | 22.9 | 98.7 | 310 | |
| 75% | 25% | 16.6 | 94.9 | 450 | 433 Average |
| | | 20.2 | 99.1 | 540 | |
| | | 24.1 | 93.2 | 310 | |
| 67% | 33% | 14.5 | 96.9 | 520 | 617 Average |
| | | 18.9 | 102.0 | 760 | |
| | | 22.6 | 96.7 | 570 | |
| 50% | 50% | 16.6 | 96.1 | 650 | 807 Average |
| | | 17.7 | 97.3 | 930 | |
| | | 21.8 | 93.9 | 840 | |

Pelletized aggregate from FBCR-fly ash mixtures can also be made. In this case, pellet formation may be accomplished by means of either a pan or roll pelletizer.

EXAMPLE 2

Pelletized aggregate was made from varying FBCR-bituminous fly ash mixtures and from FBCR-FBC fly ash (top ash or flue ash in a fluidized bed combustion system). The pellets were produced by either roll pelletizing or pan pellitizing with moisture utilized as the binder in the roll pellitizing runs and with a sodium silicate solution being used for the pan pellitizer runs. The FBCR-fly ash proportions, mix additives and my remarks on the produced pellets are listed in Table IX hereinbelow.

TABLE IX
SUMMARY OF PELLETIZING TRIALS

| Mixture Percent by Weight | Pelletizing Technique | Mix Additive | Remarks Pellets |
|---|---|---|---|
| 50% FBC Residue 50% Bituminous Fly Ash | Roll | 22% Moisture | Good condition - resisted moderate to strong finger pressure, some surface dusting |
| | Pan | 15% Sodium Silicate Solution | |
| 80% FBC Residue 20% Bituminous Fly Ash | Roll | 19% Moisture | Good condition - resisted moderate to strong finger pressure, more surface dusting than 50-50 pellets |
| | Pan | 15% Sodium Silicate Solution | |
| 50% FBC Residue 50% FBC Fly Ash | Roll | 18% Moisture | Resisted moderate finger pressure; easily abraded. |
| | Pan | 15% Sodium Silicate Solution | Could not be pelletized. |
| 80% FBC Residue 20% FBC Fly Ash | Roll | 18% Moisture | Could not resist light finger pressure |
| | Pan | Sodium Silicate Solution of Varying Strengths | Could not be pelletized. |

In accordance with another aspect of the invention, concrete masonry units may be produced comprising varied proportions of FBCR, aggregate, fly ash, and portland cement. In this respect, it has been found that the following percentages by weight of the various components (based on the dry mix weight) have been useful: 25-60 weight % aggregate, 5-12 weight % fly ash, 25-60% FBCR, and 3-10 weight % portland cement.

EXAMPLE 3

Eight trial batches of masonry block, the compositions of which are herein reported in Table X were prepared and cured in a steam heated tunnel kiln for 24 hours at approximately 130° F. The block specimens were stored on trays which were placed in frames. The frames were placed in the kiln in the order in which the batches were prepared. After the initial kiln cure, the frames were removed from the kiln. Two days after molding, blocks from each batch were tested in accordance with ASTM C-140, and the testing was repeated at 12 days of age and at 30 days of age. Table X also indicates the compressive strengths of the various masonry units produced in accordance with this Example, as tested by ASTM C-140.

TABLE XI

| Mix No. | Briquette Composition (% by Dry Weight) | | | Water | Briquette (Dimensions-inches) | Specific Gravity (Saturated Surface Dry) | Absorption (%) | Vacuum[1] Saturated Strength (Load-lbs) |
|---|---|---|---|---|---|---|---|---|
| | FBCR | Fly Ash | Sulfate Waste | | | | | |
| 2 | 80 | 20 | — | 13.6 | 1.6 × 0.8 × 0.4 | 2.05 | 15.4 | 28 |
| 4* | 50 | 50 | — | 20.0 | 1.4 × 1.4 × 0.7 | 1.88 | 23.1 | 60 |
| 7 | 32 | 14 | 54 | 14.0 | 1.4 × 1.4 × 0.7 | 1.91 | 17.3 | 80 |
| 8 | 30 | 70 | — | 13.5 | 1.4 × 1.4 × 0.7 | 1.78 | 20.4 | 98 |

[1]All briquettes were stored at room temperature for 7 days.
*Ethyl silicate solution used as an additive.

TABLE X

MIX DESIGN AND TEST RESULTS FOR CONCRETE MASONRY UNITS
COMPOSITION
(Pounds per Cubic Yard)

| Mix Designation | Control | Mix 1 | Mix 2 | Mix 3 | Mix 4 |
|---|---|---|---|---|---|
| Portland Cement - Type 1 | 328 | 349 | 327 | 319 | 118 |
| Limestone Screenings Aggregate (⅜") | 3635 | 2044 | 1918 | 933 | 2247 |
| Fly Ash - National Mineral Corp. | 71 | 215 | 404 | 394 | 237 |
| AFB Residue | 0 | 1077 | 1010 | 1969 | 1185 |
| Water | 246 | 358 | 348 | 364 | 310 |
| Total Weight per Cubic Yard | 4279 | 4043 | 4008 | 3979 | 4097 |
| Compressive Strength @ 30 Days Age | 820 psi | 1070 psi | 1453 psi | 212 psi | 278 psi |
| Dry Unit Weight @ 30 Days Age | 130.7 pcf | 119.5 pcf | 131.3 pcf | 102.1 pcf | 106.8 pcf |
| Absorption | 8.1% | 10.8% | 6.9% | 18.0% | 15.8% |
| % Compaction (Based on theoretical dry unit weight) | 87.5% | 87.6% | 96.8% | 76.3% | 76.2% |

NOTE:
The control mix and mix numbers 1 and 2 can be compared directly, but the proportions of fine and coarse fractions in mix numbers 3 and 4 resulted in low densities which, therefore, did not provide a satisfactory product.

EXAMPLE 4

A pilot plant study was run on a small industrial size briquetting machine in which a number of mixtures were used to demonstrate the subject invention. The materials used consisted of FBC residue from the first plant, a pulverized coal fly ash produced from bituminous coal, from the Baltimore Gas & Electric Co., and a calcium sulfate waste sludge from Glidden Pigments Co. Preliminary formulations were evaulated using a laboratory Carter press. Small sized plugs were formed under pressure of 3,000 psi which is typical of pressures obtained in briquetting roll equipment. After determining the specific water content required and the proper fly ash concentration, the material was then shipped to the test site after first preparing the mixture in a small Lancaster batch blender. A number of these compositions were then used to prepare the briquetted specimens. Table XI shows the composition of these mixtures in addition to results of tests which were performed on the finished product. The vacuum saturation test listed in the table represents a test for durability (freeze/thaw resistance) (ASTM C-593). These results are exceptionally good thereby indicating that the briquettes can be stockpiled successfully under adverse weather conditions.

After completing the tests outlined in Example 4, some of the briquettes were subjected to further evaluation by feeding the cured product through a small stone crusher. FIG. 1 shows the resulting gradation of the crushed material, together with a control test using commercial lime-stone rock (which was sized similarly to the briquettes). Tables XII and XIII show test results of the performance of these crushed aggregates. It can be concluded from these test results that the crushed briquetted material compares favorably with natural stone and easily meets the requirements for ASTM standards for construction grade aggregates.

It is to be noted that the masonry units, briquettes, and other articles produced hereby may be used by themselves, or may be crushed into aggregates of various sizes. Due to the surprisingly high compressive strengths of the disclosed mixes, they can be successfully employed in load bearing situations wherein conventional concrete formulations are now used. The aggregates exhibit excellent dimensional stability, high structural strength, relatively low permeability and leachability. Due to the low permeability characteristics of the produced aggregates, they may be readily stockpiled without causing environmental concern due to leaching and surface run-off as is the case in the stockpiling of many other industrial waste products.

The extraordinary properties of the products made in the briquetting process provides a product with physical properties that, in a number of situations, excel over those products made by the other procedures outlined in the invention. Of particular importance is the ability of this material to be handled and crushed in the same manner that conventional quarry stone is treated. The resulting crushed aggregate compares in physical properties to that obtained with conventional rock such as limestone. This is clearly demonstrated in Tables XII and XIII which provides comparisons which relate to the properties of abrasion resistance (Los Angeles rattler test) and quality of concrete specimens with the two different compositions and a limestone aggregate. With strengths and properties of this nature, the product is acceptable for construction uses and, in addition, is particularly advantageous in that the unit weight of the material is lower than the conventional limestone. Aggregates are normally sold by the ton but they are used by the cubic yard. Therefore, a higher yield of a construction composition is realized using the product of the invention.

Surprisingly, the synthetic aggregates prepared by the present invention without the use of portland cement have a Los Angeles Rattler Abrasion resistance of less than 50%.

TABLE XII
PHYSICAL PROPERTIES OF BRIQUETTES CONTAINING AFB RESIDUE

| Briquette Composition (Percent by Dry Weight) | | | Bulk Specific Gravity* | Percent Absorption* | Los Angeles Abrasion Loss** (Percent) |
|---|---|---|---|---|---|
| AFB Residue | Fly Ash | Sulfate Waste | | | |
| 30 | 70 | — | 1.62[1] | 15.9[1] | 31.4[4] |
| 15 | 35[(a)] | 50[(b)] | 1.76[2] | 12.8[2] | 34.1[5] |
| Limestone Aggregate | | | 2.79[3] | 0.3[3] | 29.1[5] |

*Test performed on whole briquettes.
**Test performed on crushed briquettes.
[(a)]obtained from Baltimore Gas & Electric Co.
[(b)]obtained from Glidden Pignants Co.
[1]Represents average of 5 test values and determined in accordance with ASTM C127-80, "Standard Test Method for Specific Gravity and Absorption of Coarse Aggregate".
[2]Represents average of 2 test values as determined in accordance with ASTM C127-80.
[3]Values provided by commercial aggregate producer.
[4]Represents average of 2 test values as determined in accordance with modification of ASTM C131-76, "Standard Test Method for Resistance to Abrasion of Small Size Coarse Aggregate by Use of the Los Angeles Machine".
[5]One test value as determined in accordance with modification of ASTM C131-76.

XIII
PHYSICAL PROPERTIES OF PORTLAND CEMENT CONCRETE CONTAINING CRUSHED AFB RESIDUE BRIQUETTES AS COARSE AGGREGATE FRACTION

| Briquette Composition (Percent by Dry Weight) | | | Concrete Mix Composition (Pounds per Cubic Yard) | | | | Unit Weight of Concrete (Lbs. per Ft.³) | Compressive Strength (Pounds per Square Inch) | |
|---|---|---|---|---|---|---|---|---|---|
| FBCR Residue | Fly Ash | Sulfate Waste | Portland Cement | Coarse Aggregate | Fine Aggregate | Total[1] Water | | After 7 Days | After 28 Days |
| 30 | 70 | — | 439 | 1181 | 1229 | 526 | 125[2] | 1577[2] | 2951[2] |
| 15 | 35 | 50 | 450 | 1214 | 1266 | 529 | 128[2] | 773[2] | 1578[2] |
| Limestone Aggregate | | | 439 | 1748 | 1305 | 393 | 145[2] | 1969[2] | 2658[3] |

[1]Includes water of absorption.
[2]Unit weight and compressive strength values based on an average of two mixes.
[3]Unit weight and compressive strength values based on one mix.

In the usual case the additives is added in the form of a solution during the curing of the aggregate or subsequent to the crushing step. The solution can be simply sprayed on the material or the product can be submerged for a short period of time in the solution containing the additive. It is also acceptable to expose the aggregate to an atmosphere of $CO_2$ as disclosed in U.S. Pat. No. 4,233,008.

As mentioned above, the high quality of these aggregates are available without the addition of high energy strength binders such as portland cement.

All the aggregates of the invention are especially useful for combination in various concrete mixes, mortar mixes, road base material mixes and in landfill mixes. The aggregate may also be used as ballast in varied applications.

The term "limestone" as herein used refers to naturally occurring limestone or dolomite generally consisting of calcium carbonate or a mixture of calcium carbonate and magnesium carbonate. As further used, reference to the "hydration of lime" or to "hydrated lime" refers to calcium hydroxide (hydrated high calcium quicklime) or a mixture of calcium hydroxide and either magnesium oxide (dolomitic monohydrate) or magnesium hydroxide (dolomitic dihydrate).

Those skilled in the art may make certain modifications or substitutions to my invention without departing from the true spirit thereof. The appended claims are intended to cover all substitutions and equivalent modifications.

I claim:

1. In a method of preparing synthetic shaped cementitious compositions having high quality even without the addition of high energy binders such as portland cement, the steps which comprise:
   (a) collecting and admixing the spent residue from a fluidized combustion bed of the type wherein limestone particles are suspended in a fluidized medium and sulfur oxides are captured and pulverized coal fly ash,
   (b) adding controlled amounts of water to said residue-fly ash mixture,
   (c) compacting and forming the mixture produced as a result of step (b) to the desired shape, and
   (d) curing the shaped article, whereby the article, even if prepared without any such high energy binder, has a Los Angeles Rattler abrasion resistance of less than 50%.

2. The method as defined in claim 1 including adding in step (a) a material selected from the group consisting of magnesium carbonate ethyl silicate and magnesium fluorosilicate.

3. The method as defined in claim 1 further comprising crushing said shaped article into aggregate pieces.

4. The method as defined in claim 1 wherein step (c) comprises briquetting.

5. Method as defined in claim 1 wherein said step (b) comprises adding from 10-30 weight percent water to said residue based upon the weight of said residue.

6. Method as defined in claim 1 wherein said step (b) comprises mixing the mixture of water and spent residue for a period of about 15 minutes.

7. Method as defined in claim 5 wherein the water content of the fly ash and residue mixture is controlled to within the range of about 9 to 19% by weight, based upon the weight of said residue and said fly ash.

8. Method as defined in claim 1 further comprising the step of allowing the mixture of residue and water to cool prior to the performance of said step (c).

9. Method as defined in claim 1 further comprising adding an aggregate material to the residue-fly ash mixture.

10. A method as defined in claim 1 comprising adding cement to the moist mixture of fly ash and residue and compacting the mixture into the shape of a masonry block.

11. Method as defined in claim 1 wherein said curing is at ambient temperature for a period of from about 7–28 days.

12. Method as defined in claim 1 wherein fly ash and residue are provided in amounts of about 10–50% by weight fly ash per 90–50% by weight residue.

* * * * *